A. HOFFECKER.
SPEEDOMETER.
APPLICATION FILED DEC. 11, 1908.
1,087,658.
Patented Feb. 17, 1914.
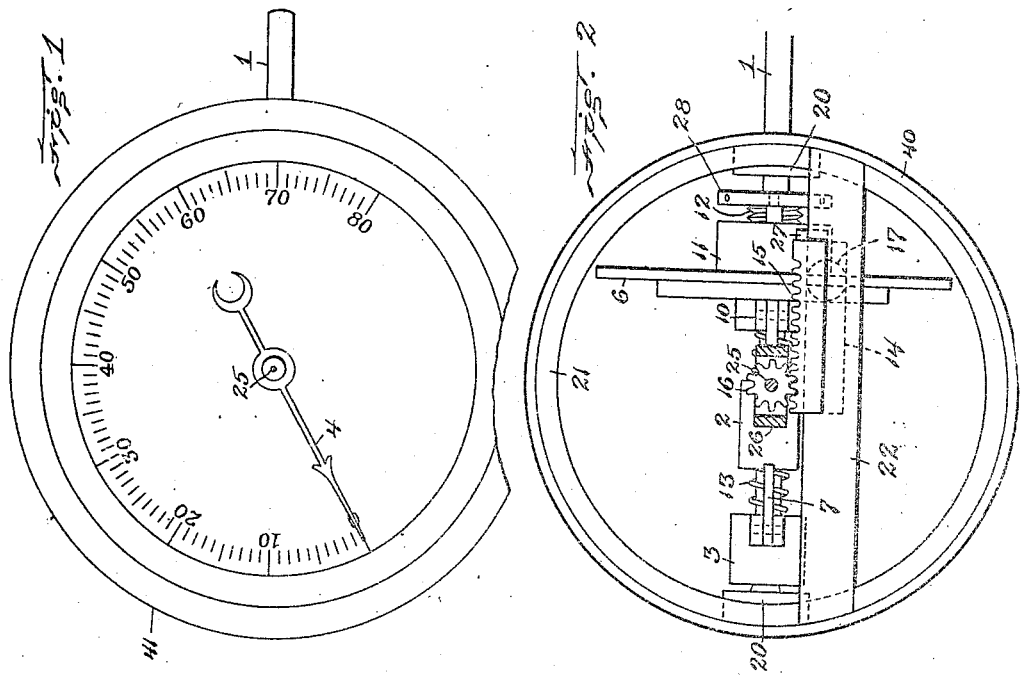
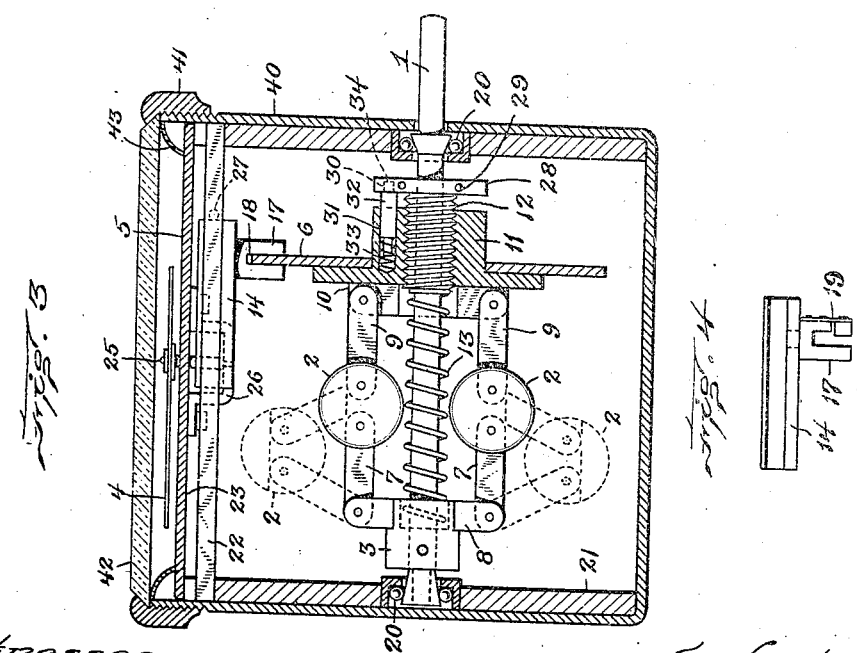
Witnesses:
W. P. Abell
P. N. Pezzetti
Inventor
Abram Hoffecker
by Wright Brown Quinby Mays
Attorneys

UNITED STATES PATENT OFFICE.

ABRAM HOFFECKER, OF BOSTON, MASSACHUSETTS, ASSIGNOR TO RELIANCE SPEEDMETER COMPANY, OF BOSTON, MASSACHUSETTS, A CORPORATION OF MAINE.

SPEEDOMETER.

1,087,658.  Specification of Letters Patent.  Patented Feb. 17, 1914.

Application filed December 11, 1908. Serial No. 466,993.

*To all whom it may concern:*

Be it known that I, ABRAM HOFFECKER, of Boston, in the county of Suffolk and State of Massachusetts, have invented certain new and useful Improvements in Speedometers, of which the following is a specification.

This invention relates to instruments for measuring the speeds of moving bodies, and is particularly intended for use with vehicles, to show the speed at which they are moving.

The object of the invention is to simplify the construction of such instruments so as to furnish one having the minimum number of parts consistent with accurate operation and convenient reading of the indications.

The essential features of a speed-measuring instrument are a device put in motion by the movement of the object whose speed is to be measured, and adapted to vary its position in accordance with the speed of the object, an indicator by which the speed may be shown in terms of units of distance per unit of time, and connections between such variable device and the indicator, whereby the movements of the latter are governed by the former. By my present invention I have reduced such intermediate connections to the lowest possible terms, and have produced a mechanism which is accurate, simple in construction, economical to manufacture, and practically incapable of getting out of order.

In the accompanying drawings I have illustrated an apparatus embodying the principles of my invention, in which,—

Figure 1 represents a plan view of the instrument, showing the dial and indicator. Fig. 2 represents a plan view of the same with the dial plate removed, showing the internal parts. Fig. 3 represents a vertical longitudinal section of the instrument. Fig. 4 represents a modification of the connection between the disk and rack.

The same reference characters indicate the same parts in all the figures.

The essential parts of the instrument comprise a shaft 1 which is driven rotarily by the vehicle or other moving object of which the speed is to be determined, a centrifugal governor consisting of two weights 2 2 which are linked to a collar 3 secured to and rotated by the shaft, a pointer 4 operating in connection with a dial 5 to show speeds, and a disk 6 operated by the weights and engaged with the pointer to communicate movements thereto. The weights are connected by links 7 to lugs 8 formed on the collar, said links being pivoted to the lugs, and by similar links 9 to the disk, the latter having lugs 10 to which said links are pivoted. The weights being thus pivotally connected to the shaft and to the disk are free to move outward by centrifugal force, and act in the manner of a centrifugal governor. As the speed increases, they move farther and farther away from the shaft, traveling in a variable orbit, the diameter of which increases as the speed increases, until at the highest speed which the instrument c n measure, the weights occupy the positions indicated in dotted lines in Fig. 3. In moving to these positions, the weights draw the disk axially along the shaft, for the disk is mounted with provision for such movement, and has a hub 11 containing a hardened steel sleeve 12 which surrounds the shaft with sufficient looseness to permit movement thereon, but tightly enough to prevent side play. The movement of the disk toward the collar 3, and hence the outward movements of the weights, are resisted by a spring 13 surrounding the shaft and bearing against the collar 3 and disk. This spring also acts to restore the members to their normal position, illustrated in full lines in Fig. 3, when the vehicle is at rest or is diminishing in speed. The strength of the spring determines the range of speeds which the instrument is capable of measuring, and by using springs of different tensions, the same or similar instruments may be rendered capable of indicating a great variety of speeds. The motion of the disk 6 along the shaft is communicated to the pointer 4 by means of a slide 14 having a rack 15 meshing with a pinion 16 on the shaft of the pointer. The slide is connected with the disk in such a way as to be unaffected by the rotation thereof, but to follow every change in the position of the disk longitudinally of the shaft. The preferred connection between the disk and slide is a stud 17 secured in the slide, projecting therefrom toward the disk, said stud having a slot 18 which receives the rim of the disk and is fitted so as to embrace the disk with the least possible lost motion.

A modified construction by which lost motion is absolutely eliminated is illustrated in Fig. 4, in which the stud is cut away on one side so that it engages the disk on only one side, but it has secured to it a spring 19 which presses yieldingly against the other side of the disk, the body of the stud and the spring being thereby held in yielding contact at once with both sides of the disk, whereby lost motion is wholly prevented.

The shaft is rotatably mounted on ball bearings 20 in opposite sides of a tubular holder 21, and the slide 14 is mounted on a bar 22 which is set into notches in the upper rim of the tubular holder. The slide is made so as to embrace the upper and lower sides of the bar, whereby it is guided in a straight line. A dial plate 23 is secured by suitable means to the upper rim of the tubular holder 21, and this plate carries an enameled dial 5 having the speed indicating graduations. The staff 25 of the pointer has a bearing in the plate 23 and a pivot at its end held in a bearing in the bracket 26 which is hung from the under side of the dial plate. The pinion 16 which is secured to the staff 25 holds the slide 14 against the edge of the bar 22. A pin 27 is mounted on the bar so as to be engaged by the slide and limit the movement thereof in one direction. It is set so as be engaged by the slide when the pointer is opposite the zero of the scale. The pin also serves to limit the movement of the disk away from the collar 3 under the influence of spring 13.

The sleeve 12 previously referred to is located so as to take the thrust of the spring 13 and is preferably made adjustable so as to regulate the thrust of the spring and so calibrate the instrument. For this purpose the sleeve is provided with external screw threads which engage complemental internal threads in the hub 11. Beyond the end of the hub the sleeve is provided with a collar or flange 28 by which it may be turned, such collar having a hole 29 in its periphery to receive a pin or instrument for turning it. By screwing the sleeve more or less into the hub of the disk and so increasing or diminishing the tension of the spring, any slight inaccuracy of the latter may be corrected without necessitating alteration of the spring itself. As a convenient means for securing the sleeve in its adjustments, I provide the collar with a circular series of holes 30 and drill a recess 31 longitudinally into the hub 11. In this recess is set a pin 32 and a spring 33, the latter being in back of the pin and tending to force it outward. The end 34 of the pin is of a size to permit it to enter the holes 30 and thereby lock the sleeve.

The whole apparatus, including the tubular frame and dial are inclosed in a cylindrical casing 40 to the upper end of which is secured a ring 41 carrying a glass plate 42. Between the plate and dial is a bezel 43.

It will be seen from the foregoing that the connections between the centrifugal governor and the indicator are the simplest possible and consist of as few parts as can be employed when the indicator is an oscillating pointer, as there are only two elements, to wit:—the disk and the rack between the governor and the pointer.

Variations in the specific construction and arrangement of the mechanism may be made without departing from the spirit of my invention, and I do not therefore limit myself to the exact details of the same hereinbefore described and shown.

I claim:—

1. A speed measuring instrument comprising a horizontally arranged shaft, a collar secured to said shaft, a cylindrical casing of which the axis is perpendicular to the shaft, having bearings for the shaft at opposite points in its side walls, a hub surrounding said shaft and adapted to slide longitudinally thereon, a spring interposed between said collar and hub tending to hold them apart, balanced weights arranged on diametrically opposite sides of said shaft, links pivotally connected to the hub on opposite sides of the axis and connected respectively to the two weights, links also connecting the weights with the collar, whereby said weights are enabled to swing outwardly by centrifugal force when the shaft is rotated, and to draw the hub along the shaft against the tension of said spring, a rack guided to move in a path parallel to said shaft, a pointer mounted to revolve and in geared relation with said rack so as to be rotated by movements thereof, the rack and pointer both being in the casing directly over the shaft, and a connection between said rack and hub through which movements of the latter along the shaft are transmitted to the rack.

2. A speed measuring instrument comprising a horizontally arranged shaft, a collar secured to said shaft, a hub surrounding said shaft and adapted to slide longitudinally thereon, a spring interposed between said collar and hub tending to hold them apart, said collar and hub constituting abutments receiving the thrust of said spring, balanced weights arranged on diametrically opposite sides of said shaft, links pivotally connecting each of said weights with both the collar and hub, whereby said weights are enabled to swing outwardly by centrifugal force when the shaft is rotated and to draw the hub along the shaft against the tension of said spring, a rack guided to move in a path parallel to said shaft, a pointer mounted to revolve and in geared relation with said rack so as to be rotated by movements thereof, a connection between said rack and hub constructed to permit rotation of the hub relative to the rack through which movements of the latter along the shaft are transmitted to the rack, and a screw threaded into one of said abutments, engaging said spring, and being adjustable to vary the tension thereof.

3. A speed-measuring instrument comprising a cylindrical casing, a shaft crossing said casing transversely of the axis thereof, a guide crossing said casing parallel to said shaft and contained within the casing, an indicator pivoted coaxially with said casing, a centrifugal governor carried by said shaft, a rack mounted to travel on said guide and supported wholly thereby, and means connecting said rack with said governor and indicator.

4. A speedometer comprising a shaft, a guide bar mounted beside and approximately parallel to said shaft, a centrifugal governor carried and rotated by said shaft, a traveler linked to said governor and moved by the latter longitudinally along the shaft, a rack having a portion embracing said bar, connected with said traveler so as to be moved by the longitudinal movements of the latter, a spindle having a pinion in mesh with said rack and located so as to retain the latter on the guide bar, and an indicator carried by said spindle.

5. A speed indicator comprising a rotating shaft, a disk mounted to travel longitudinally on said shaft, a centrifugal governor linked to said shaft and disk and operable to move the latter along the shaft, an indicating pointer, and an intermediate operating device for said pointer including a slide and a projection on said slide arranged to engage one face of said disk near the rim thereof, said projection having a yielding member pressing against the opposite face of the disk, whereby longitudinal movements of the latter are transmitted with exactness to the slide.

6. A speed-measuring instrument comprising a rotating shaft, a centrifugal governor carried revolubly by said shaft, a disk surrounding said shaft and connected with said governor so as to be moved axially of the shaft thereby, a spring for resisting the action of the governor, a sleeve threaded into the disk forming a bearing for the latter on the shaft and constituting an abutment to take the thrust of said spring, said sleeve being adjustable to adjust the spring, a pointer, and an intermediate connecting means between said pointer and disk whereby the movement of the latter longitudinally of the shaft actuates the former to indicate speeds.

7. In a speed-measuring instrument, a shaft, a collar secured to said shaft, a disk mounted so as to slide longitudinally on the shaft, a sleeve surrounding the shaft and threaded into said disk so as to be adjustable axially therein, governor weights linked to said collar and disk, a spring surrounding the shaft and bearing between said collar and sleeve, a flange on the sleeve, whereby the latter may be adjusted, and a spring-pressed pin engaged with the disk and with said flange for securing the sleeve in its adjustments.

In testimony whereof I have affixed my signature, in presence of two witnesses.

ABRAM HOFFECKER.

Witnesses:
A. H. BUNN,
PETER W. PEZZETTI.